(12) United States Patent
Sun et al.

(10) Patent No.: US 10,423,020 B2
(45) Date of Patent: Sep. 24, 2019

(54) BACKLIGHT MODULE AND DISPLAY APPARATUS (71) Applicants: BOE TECHNOLOGY GROUP CO., LTD., Beijing (CN); HEFEI BOE DISPLAY LIGHTING CO., LTD., Hefei, Anhui (CN)

(72) Inventors: Wenbo Sun, Beijing (CN); Qiping Zhang, Beijing (CN)

(73) Assignees: BOE TECHNOLOGY GROUP CO., LTD., Beijing (CN); HEFEI BOE DISPLAY LIGHTING CO., LTD., Hefei, Anhui (CN)

( * ) Notice: Subject to any disclaimer, the term of this patent is extended or adjusted under 35 U.S.C. 154(b) by 0 days.

(21) Appl. No.: 15/506,737

(22) PCT Filed: May 20, 2016

(86) PCT No.: PCT/CN2016/082903
§ 371 (c)(1),
(2) Date: Feb. 25, 2017

(87) PCT Pub. No.: WO2017/117896
PCT Pub. Date: Jul. 13, 2017

(65) Prior Publication Data
US 2019/0064576 A1 Feb. 28, 2019

(30) Foreign Application Priority Data

Jan. 5, 2016 (CN) .......................... 2016 1 0012547

(51) Int. Cl.
G02F 1/1335 (2006.01)
F21V 8/00 (2006.01)
(Continued)

(52) U.S. Cl.
CPC ..... *G02F 1/133308* (2013.01); *G02B 6/0065* (2013.01); *G02B 6/005* (2013.01);
(Continued)

(58) Field of Classification Search
CPC .... G02B 6/0065; G02B 6/005; G02B 6/0055; G02B 6/0088; G02F 1/133308;
(Continued)

(56) References Cited

U.S. PATENT DOCUMENTS 7,679,694 B2 * 3/2010 Shirai ............... G02F 1/133308
349/58
9,664,846 B2 * 5/2017 Zhang ................. G02B 6/0088
(Continued)

FOREIGN PATENT DOCUMENTS

CN 202677012 U 1/2013
CN 103324342 A 9/2013
(Continued)

OTHER PUBLICATIONS

Chinese Office Action dated Jan. 23, 2018 in corresponding Chinese application No. 201610012547.2.
(Continued)

*Primary Examiner* — Tan Le
(74) *Attorney, Agent, or Firm* — Syncoda LLC; Feng Ma (57) ABSTRACT Disclosed herein includes an assembly structure, including a back cover and a frame. The back cover includes a bottom wall and at least one side wall, wherein the bottom wall and the at least one side wall cooperatively form a housing, and the bottom wall or the at least one side wall is provided with at least one first snap member. The frame includes a load plate and a side plate, wherein the side plate is provided with at least one second snap member. The at least one first snap member and the at least one second snap member are configured to form at least one snap-fit assembly.

16 Claims, 5 Drawing Sheets (51) Int. Cl.
  *F21V 7/04* (2006.01)
  *F21V 21/088* (2006.01)
  *F21V 17/16* (2006.01)
  *G02F 1/1333* (2006.01)

(52) U.S. Cl.
  CPC .......... *G02B 6/0055* (2013.01); *G02B 6/0088* (2013.01); *G02F 2001/133314* (2013.01); *G02F 2001/133317* (2013.01); *G02F 2001/133325* (2013.01); *G02F 2201/465* (2013.01)

(58) Field of Classification Search
  CPC ........ G02F 2001/133314; G02F 2001/133317; G02F 2001/133325; G02F 2201/465
  See application file for complete search history.

(56) References Cited

U.S. PATENT DOCUMENTS 10,139,555 B2 * 11/2018 Wang ................... G02B 6/0088
2009/0185097 A1 * 7/2009 Kim .................. G02F 1/133608
              349/58
2011/0261283 A1   10/2011 Kim
2013/0027965 A1   1/2013 Noh
2014/0104873 A1   4/2014 Yu et al.
2015/0131026 A1   5/2015 Chen
2016/0091656 A1 * 3/2016 Que ..................... G02B 6/0088
              349/62
2016/0259123 A1   9/2016 Zhang et al.

FOREIGN PATENT DOCUMENTS

CN    104214590 A    12/2014
CN    104867408 A    8/2015

OTHER PUBLICATIONS

International Search Report and Written Opinion dated Sep. 29, 2016 in PCT/CN2016/082903.
EESR mailed on May 14, 2019 in corresponding EP application No. 16816172.7.

* cited by examiner

BACKLIGHT MODULE AND DISPLAY APPARATUS

CROSS-REFERENCES TO RELATED APPLICATIONS

The present application claims priority to Chinese Patent Application No. 201610012547.2 filed on Jan. 5, 2016, the disclosure of which is hereby incorporated by reference in its entirety.

TECHNICAL FIELD

This disclosure relates generally to an assembly structure, and more specifically to a backlight module for a display device.

BACKGROUND

With the trend for thinner and higher screen-to-body-ratio liquid crystal display (LCD) products, the market has more requirements for better display effects of display products, which has in turn called for improved quality of backlight modules.

Figure 1:
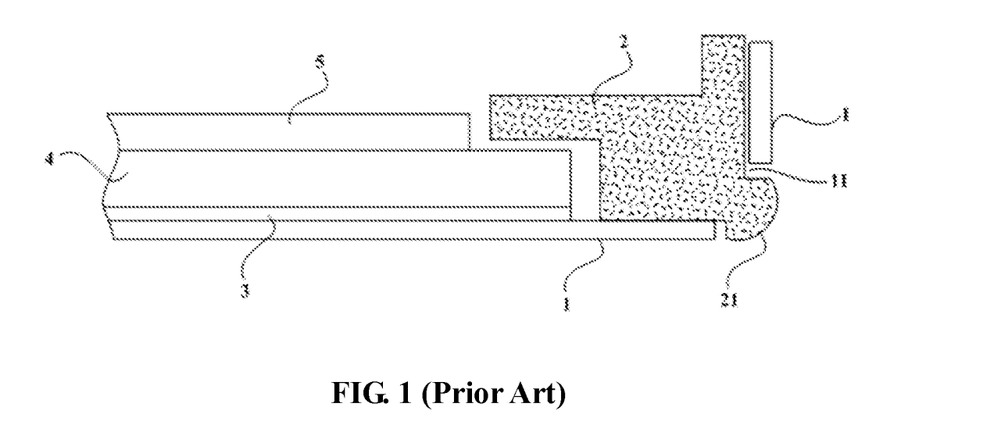
FIG. 1 is a partial cross-section view of a schematic diagram of a conventional backlight module.

FIG. 1 shows a conventional backlight module, which comprises a back cover 1, a frame 2, a reflection sheet 3, a light guide plate 4, and at least one optical film 5; wherein the back cover 1 is configured to provide a housing; the reflection sheet 3 and the light guide plate 4 are sequentially disposed in the housing of the back cover 1; the frame 2 is mounted with the back cover 1 and configured to constrain the light guide plate 4; and the at least one optical film 5 is disposed on a front side of the light guide plate 4. The back cover 1 is provided with at least one mounting slot 11, arranged between a bottom wall and at least one side wall of the back cover 1; the frame 2 is provided with at least one protruding mounting member 21, arranged at regions corresponding to the at least one mounting slot 11 of the back cover 1; and the at least one mounting member 21 is snugly mounted in the at least one mounting slot 11. In order to make a stable and secure mounting between the frame 2 and the back cover 1, a total of 13-15 sets of the mounting member 21-mounting slot 11 assembly are typically configured in a conventional backlight module.

SUMMARY

The inventors of the present disclosure have discovered various drawbacks in the conventional technologies, such as that illustrated in FIG. 1, and have invented various new structures and methods as described below, which can overcome or reduce one or more of the drawbacks of a conventional device.

For example, due to a large number of sets of the mounting member-mounting slot assembly, the assembling operation for the structure illustrated in FIG. 1 is difficult to accomplish, resulting in tedious assembling and disassembling backlight modules and leading to low productivity.

Meanwhile, the connections between the mounting members and the mounting slots are not sufficiently secure, frequently causing local dislodging of some mounting members from corresponding mounting slots, which in turn may result in bulging of the frame where the local dislodging occurs, and may lead to crushing and breaking of the liquid crystal display panel disposed at the front side.

Additionally, this conventional back cover assembly also demands a high precision on the size match between the mounting members and the mounting slots, resulting in elevated cost in quality control during manufacturing of the back covers and the frames.

In some implementations, a backlight module and a display device are provided. The assembling and disassembling of the backlight modules can be greatly simplified, leading to increased productivity, and effectively solving the problem of broken screens caused by dislodging.

In an aspect, an assembly structure is provided, which includes a back cover and a frame. The assembly structure can be employed in, for example, a backlight module for a display apparatus.

The back cover comprises a bottom wall and at least one side wall, wherein the bottom wall and the at least one side wall cooperatively form a housing, and the bottom wall or the at least one side wall is provided with at least one first snap member. Herein the "bottom wall" refers to a wall of the back cover at the bottom, over which the reflection sheet and a light guide plate, etc. of a backlight module are disposed. The "side wall" refers to a wall of the back cover on the side, which is substantially perpendicular to the bottom wall.

The frame comprises a load plate and a side plate, wherein the side plate is provided with at least one second snap member. In the whole backlight module, the at least one first snap member and the at least one second snap member are configured to form at least one snap-fit assembly. The snap-fit assembly can be securely engaged and removable.

In some embodiments of the assembly structure, the height of the frame of the assembly structure is configured such that the frame of the assembly structure is able to accommodate a backlight module.

In some embodiments of the assembly structure, the snap-fit assembly has an interlock structure.

In some embodiments, the frame may further comprise a second side plate, arranged at a front side of the load plate.

In some embodiments of this disclosure, the at least one securely engaged and removable snap-fit assembly between the at least one first snap member of the back cover and the at least one second snap member of the frame is realized by a cantilever beam-cantilever beam snap-fit connection.

In some of the embodiments, the at least one first snap member comprises at least one first cantilever beam, extending from an inner surface of the at least one side wall and pointing toward the bottom wall; and the at least one second snap member comprises at least one second cantilever beam, extending from the side plate and pointing away from the bottom wall and toward the inner surface of the at least one side wall of the back cover.

The at least one first cantilever beam and the at least one second cantilever beam are thus arranged to point at opposite directions, and an inclined surface at the end of the at least one first cantilever beam provides a directional guide for the snap-in of the at least one second cantilever beam. Thus the frame and the back cover can be assembled together conveniently by snap-fit connections. Under situations where the frame and the back cover need to be disassembled, a tool can be inserted between the back cover and the frame to push the frame inward, so as to separate the at least one second cantilever beam and the at least one first cantilever beam.

Compared with existing technologies, this approach as described above can reduce the difficulty in assembling and disassembling the backlight module and can thus increase the productivity. In addition, the at least one first cantilever beam and the at least one second cantilever beam are tightly coupled and less prone to dislodging, thereby effectively solving the problem of broken screens caused by local dislodging.

In some embodiments, the second side plate and the at least one second cantilever beam are integrated; they may belong to one single piece. In yet some other embodiments, the second side plate and the at least one second cantilever beam are separated; they may belong to separate pieces that are coupled together by bonding, direct connection, or indirect connection through a third part.

In some embodiments, the at least one securely engaged and removable snap-fit assembly between the at least one second cantilever beam and the at least one first cantilever beam may comprise 4-8 sets of snap-fit assembly for the backlight module. Compared with current technologies, because the snap-fit connection between the at least one second cantilever beam and the at least one first cantilever beam is stable and secure, the embodiments as such can be configured to apply a relatively low number of sets of the snap-fit assembly, which can further reduce the difficulty in assembling and disassembling the backlight module, thereby improving the production efficiency.

In some embodiments, the at least one second cantilever beam has a shape of a barb or an inverted triangle.

In some embodiments, an angle between the at least one second cantilever beam and the bottom wall of the back cover is 30°-45°.

In some of the embodiments, a second angle between the at least one first cantilever beam and the bottom wall of the back cover is configured to equal to the angle between the at least one second cantilever beam and the bottom wall of the back cover. The configuration as such allows a tight snap fit, as well as a convenient disassembly, between the at least one first cantilever beam and the at least one second cantilever beam.

In some embodiments, rounded corners are configured where any two neighboring surfaces of the at least one second cantilever beam intersect, which can avoid the scratching of other components of the backlight module by the at least one second cantilever beam, thereby improving the yield rate of the product.

In some embodiments, the at least one first cantilever beam is shaped by bending, and the at least one second cantilever beam is shaped by molding. The at least one first cantilever beam can be shaped by stamping of the back cover, and the at least one second cantilever beam can be shaped by injection molding of the frame, and thus the manufacturing cost is low for the back cover and the frame.

In another aspect, a method of assembling, as well as a method of dissembling, the assembly structure is provided. In some implementations, the assembly structure comprises a backlight module used for a display apparatus.

The method of assembling the backlight module can comprise:

(a) disposing a reflection sheet, an LED light source, and a light guide plate in the housing of the back cover;

(b) vertically moving the frame toward the bottom wall of the back cover such that each of the at least one second snap member is removably snapped with each of the at least one first snap member; and (c) disposing at least one optical film over a light emitting surface of the light guide plate.

In some embodiments of the method, a mounting tape is used in step (a) to bond the light guide plate with the bottom wall of the back cover.

In some embodiments, a shading tape is used in step (c) to bond the at least one optical film with the frame.

The method of dissembling the backlight module can comprise pushing the frame inward to disassemble each of the at least one securely engaged and removable snap-fit assembly such that the at least one second snap member and the at least one first snap member are separated. In some embodiments of the method, a tool, such as a flat-blade screw driver, may be used to insert between the back cover and the frame to push the frame inward for disassembly.

This disclosure also provides a display apparatus, comprising a backlight module according to any of the embodiments as described above. The display apparatus allows for a high production efficiency and high quality as a result of solving of the problems of broken screens caused by dislodging of the frame from the back cover.

Other embodiments and implementations may become apparent in view of the following descriptions and drawings.

BRIEF DESCRIPTION OF DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

DETAILED DESCRIPTION

In the following, with reference to the drawings of the embodiments disclosed herein, the technical solutions of the embodiments of the invention will be described in a clear and fully understandable way. It is noted that the described embodiments are merely a portion but not all of the embodiments of the invention. Based on the described embodiments of the invention, those ordinarily skilled in the art can obtain other embodiment(s), which come(s) within the scope sought for protection by the invention.

To reduce the difficulty in assembling and disassembling backlight modules, increase productivity, and effectively solve the problem of broken screen caused by dislodging in the backlight module, the present disclosure provides an assembly structure, a backlight module, and a display device. The following embodiments of will be described in further detail to better illustrate the purpose, solutions, and merits of some of the inventive concepts.

Figure 2:
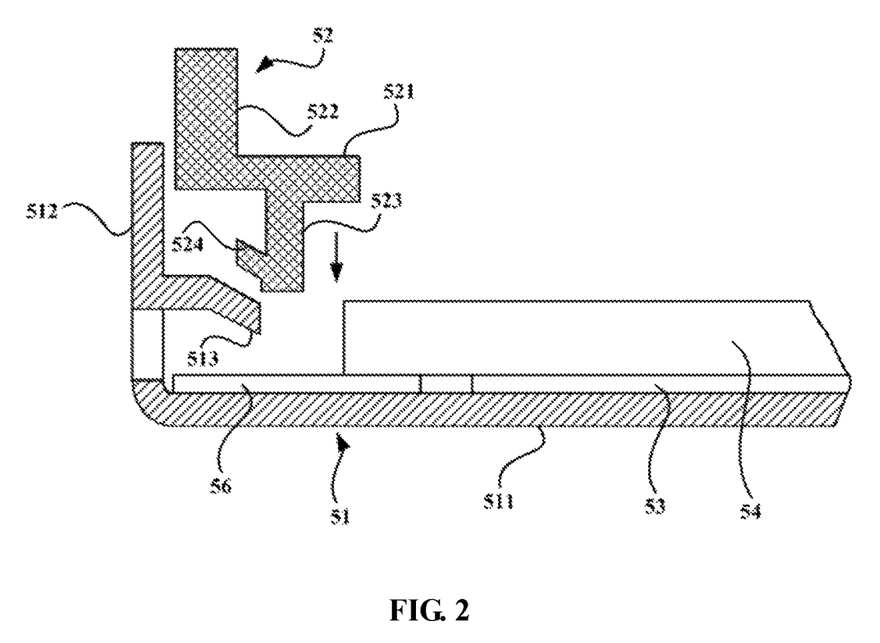
FIG. 2 is a partial cross-section view of a schematic diagram of a backlight module according to some embodiments of the disclosure (before assembly of the frame with the back cover)
Figure 3:
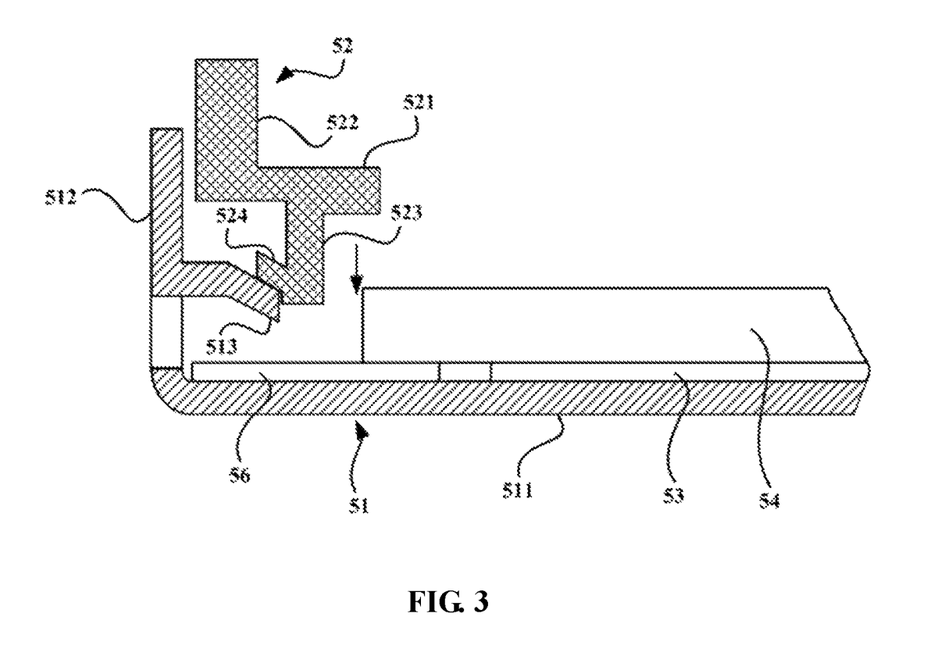
FIG. 3 is a partial cross-section view of a schematic diagram of a backlight module according to some embodiments of the disclosure (during assembly of the frame with the back cover)
Figure 4:
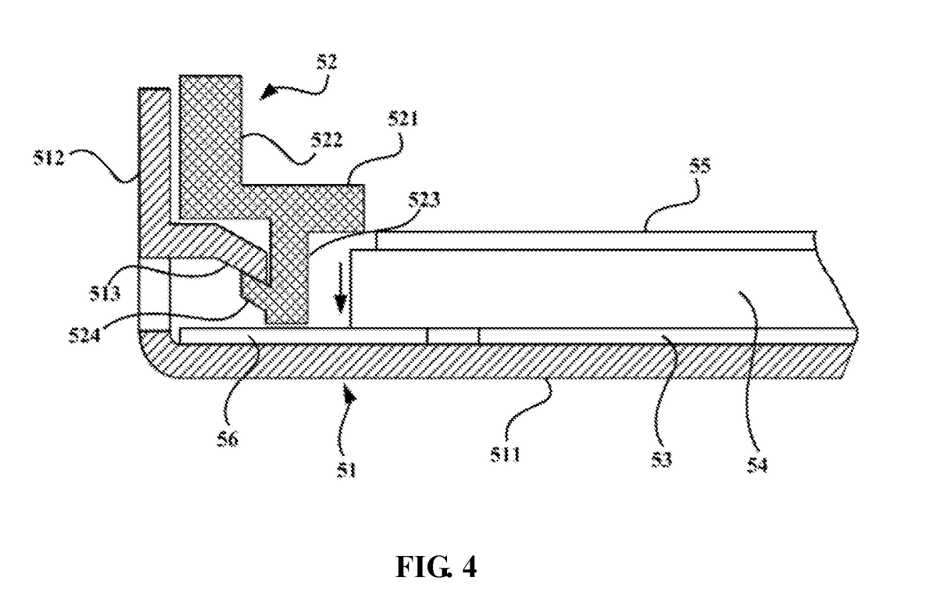
FIG. 4 is a partial cross-section view of a schematic diagram of a backlight module according to some embodiments of the disclosure (after assembly of the frame with the back cover)

FIGS. 2-4 illustrate a backlight module according to some embodiments of the disclosure, among which FIG. 2 is a partial cross-section view of a schematic diagram of a backlight module according to some embodiments of the disclosure (before assembly of the frame with the back cover); FIG. 3 is a partial cross-section view of a schematic diagram of a backlight module according to some embodiments of the disclosure (during assembly of the frame with the back cover); FIG. 4 is a partial cross-section view of a schematic diagram of a backlight module according to some embodiments of the disclosure (after assembly of the frame with the back cover).

The backlight module comprises a back cover 51 and a frame 52. The back cover 51 comprises a bottom wall 511 and at least one side wall 512, wherein the bottom wall 511 and the at least one side wall 512 cooperatively form a housing, and the at least one side wall 512 is provided with at least one first cantilever beam 513, extending from an inner surface of the at least one side wall 512 toward the bottom wall 511. The frame 52 comprises a load plate 521, a first side plate 522, a second side plate 523, and at least one second cantilever beam 524, wherein the first side plate 522 is arranged at a front side of the load plate 521, the second side plate 523 and the at least one second cantilever beam 524 are arranged at a rear side of the load plate 521, and the at least one second cantilever beam 524 extends away from the bottom wall 511 of the back cover 51, and is configured to form a securely engaged and removable snap-fit assembly with the at least one first cantilever beam 513. It is noted that the "front side" of the load plate is defined as the side of the load plate 521 of the frame facing the at least one side wall 512 of the back cover 51 in the assembly structure, and the "rear side" of the load plate as the side of the load plate 521 opposite to the "front side". It is also noted that, in addition to the embodiment of the backlight module as shown in FIG. 2 and as described above, wherein the at least one first cantilever beam 513 is disposed on the at least one side wall 512, the at least one first cantilever beam 513 can alternatively be disposed on the bottom wall 511 (not shown in drawings), configured such that the at least one first cantilever beam 513 can form at least one snap-fit assembly with the at least one second cantilever beam 524. For example, the at least one first cantilever beam 513 may have a shape of a hook, which extends from the bottom wall 511 and has an end pointing toward the bottom wall 511.

In addition to the back cover 51 and the frame 52, the backlight module as shown in FIG. 4 can further comprises, as known by those of ordinary skill in the art, a reflection sheet 53, a light guide plate 54, at least one optical film 55, a light guide plate mounting tape 56, and an LED light source (not shown in the figure), etc. A display device typically comprises a backlight module, liquid crystal panel and a front cover. In the embodiments of the backlight module disclosed herein, the front side is interpreted as a side closer to the liquid crystal panel, and the rear side is interpreted as a side farther from the liquid crystal panel.

In some embodiments of this disclosure, the at least one first cantilever beam 513 and the at least one second cantilever beam 524 are arranged to point at opposite directions, and an inclined surface at the end of the at least one first cantilever beam 513 provides a directional guide for the snap-in of the at least one second cantilever beam 524. Thus the frame 52 and the back cover 51 can be assembled together conveniently by snap-fit connections. Under situations where the frame 52 and the back cover 51 need to be disassembled, a tool can be inserted between the back cover 51 and the frame 52 to push the frame 52 inward, so as to separate the at least one second cantilever beam 524 and the at least one first cantilever beam 513.

Compared with existing technologies, the approach as described above can reduce the difficulty in assembling and disassembling the backlight module and thus increase the productivity. In addition, the at least one first cantilever beam 513 and the at least one second cantilever beam 524 are tightly coupled and less prone to dislodging, thereby effectively solving the problem of broken screens caused by dislodging of the mounting members from the corresponding mounting slots in current technologies. Additionally, this approach has a lower requirement for the precision on the size match between the at least one first cantilever beam 513 and the at least one second cantilever beam 524 than the current technologies, which results in reduced cost in the quality control during manufacturing of the back covers 51 and the frames 52.

As can be recognized by those of ordinary skill in the art, the shape of the at least one second cantilever beam 524 is not limited to an inverted triangle or a barb as shown in FIG. 2, but can be other shapes.

In some embodiments, as shown in FIG. 2, the at least one second cantilever beam 524 and the second side plate 523 are integrated, which can increase the structural strength of the second side plate 523 and of the whole frame 52. In an optional embodiment, the at least one second cantilever beam and the second side plate can be separated.

Figure 5:
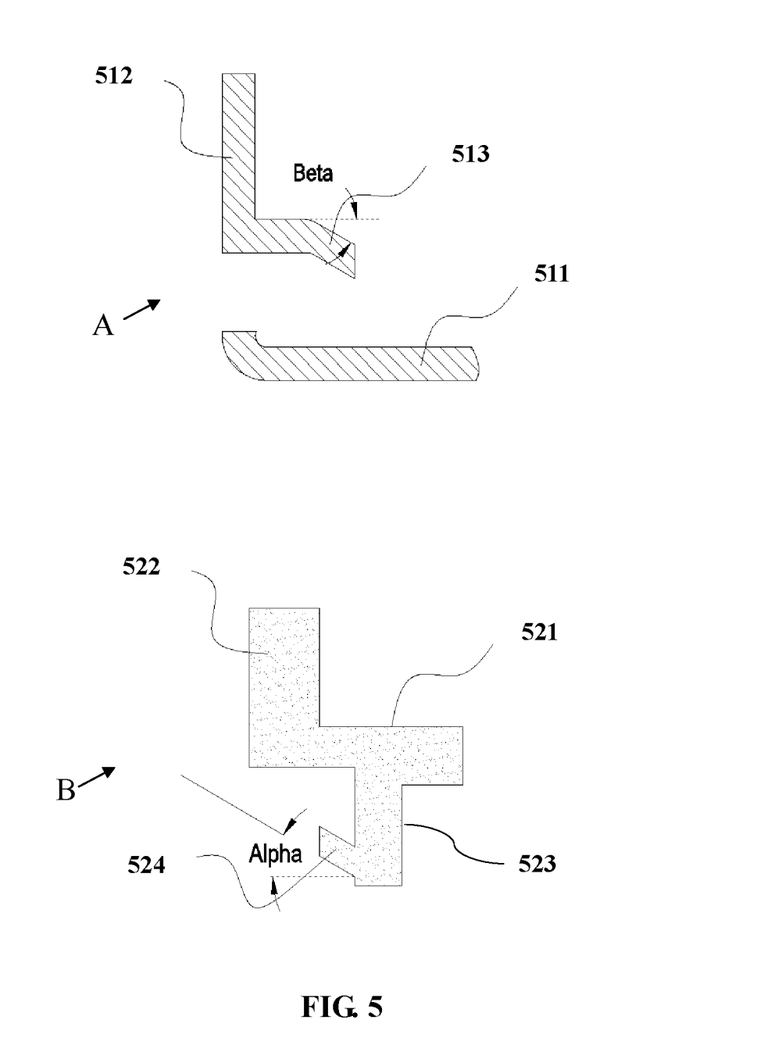
FIG. 5 is a partial cross-section view of a schematic diagram of a back cover (A) and a frame (B) of a backlight module according to some embodiments of the disclosure.

As shown in FIGS. 5A and 5B, the angle between the at least one second cantilever beam 524 and the bottom wall 511 of the back cover 51 (shown as the angle between the at least one second cantilever beam 524 and a dashed horizontal line, which is in parallel with the bottom wall 511 of the back cover 51) is set as Alpha, and the angle between the at least one first cantilever beam 513 and the bottom wall 511 of the back cover 51 (shown as the angle between the at least one first cantilever beam 513 and a dashed horizontal line, which is in parallel with the bottom wall 511 of the back cover 51) is set as Beta.

Given the materials used for the frame 52, the angle Alpha is preferably 30°-45° so as to make the snap-fit assembly easy and convenient. Furthermore, the angle Beta can be configured to equal to the angle Alpha, so as to allow a tight snap fit, as well as a convenient disassembly, between the at least one first cantilever beam 513 and the at least one second cantilever beam 524.

In some embodiments, rounded corners are configured where any two neighboring surfaces of the at least one second cantilever beam 524 intersect (not shown in the drawings), which can avoid the scratching of the other components of the backlight module by the at least one second cantilever beam 524, thereby improving the product yield rate.

In some embodiments, the at least one first cantilever beam 513 is shaped by bending, and the at least one second cantilever beam 524 is shaped by molding. The at least one first cantilever beam 513 can be shaped by stamping of the back cover, and the at least one second cantilever beam 524 can be shaped by injection molding of the frame, and thus the manufacturing cost is low for the back cover 51 and the frame 52.

The number of sets of the snap-fit assembly is not limited to those shown in the drawings. In some embodiments, the number depends on whether a secure connection between the frame 52 and the back cover 51 can be accomplished. In some implementations, there are 4-8 sets of the snap-fit assembly between the at least one second cantilever beam 524 and the at least one first cantilever beam 513.

Compared with existing technologies, because the snap-fit connection between the at least one second cantilever beam 524 and the at least one first cantilever beam 513 is stable and secure, the embodiments as such can be configured to apply a relatively low number of sets of the snap-fit assembly, which can further reduce the difficulty in assembling and disassembling of the backlight module, thereby improving the production efficiency.

The assembly method of the backlight module as illustrated in FIG. 4 can include the following steps:

Disposing the reflection sheet 53 and a light guide plate mounting tape 56 in the back cover 51;

Disposing an LED light source (not shown in the figure) in the back cover 51;

Disposing the light guide plate 54 in the back cover 51, and bond the light guide plate 54 with the light guide plate mounting tape 56;

Vertically snapping the frame 52 in the back cover 51, and the frame 52 undergoes elastic deformation under the push of the back cover 51, which allows each of the at least one second cantilever beam 524 to vertically move beyond the block by, and to snap fit with, each of the at least one first cantilever beam 513;

Disposing the at least one optical film 55 over a light emitting surface of the light guide plate 54, and bond the at least one optical film 55 with the frame 52 via a shading tape (not shown in the figure).

When it is required to disassemble the frame 52 and the back cover 51, a flat-blade screw driver or a special tool can be used to insert between the back cover 51 and the frame 52 to push the frame 52 inward, so as to separate each of the at least one second cantilever beam 524 and each of the at least one first cantilever beam 513. When all of the at least one second cantilever beam 524 are separated from all of the at least one first cantilever beam 513, the frame 52 is disassembled from the back cover 51.

This disclosure also provides a display device, comprising a backlight module according to any of the embodiments as described above. The display device has a high production efficiency and high quality due to the effective solving of the problems of broken screens caused by dislodging of the frame from the back cover.

The types of display devices that can employ the embodiments described above are not limited to the examples described. Rather, the display devices can be of many types, such as an LCD TV, an LED display, an OLED display, a computer display, a smart phone, a tablet computer, or a notebook, etc.

In some embodiments, the assembly structure is configured in a modular structure comprising different components. The assembly structure can be used as a backlight module for a display device.

In some embodiments, the assembly structure can be used in other applications, such as securing a panel and providing mechanical support to the panel. The panel can be an electronic device, a piece of painting, or any other delicate structure that can be assembled and secured according to various embodiments disclosed herein.

Compared with current technologies, the technical approaches disclosed herein may reduce the difficulty in assembling and disassembling the backlight module and effectively solves the problem of broken screens caused by dislodging.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An assembly structure comprising:
a back cover, and
a frame, wherein:
the back cover comprises a bottom wall and at least one side wall, wherein the bottom wall and the at least one side wall cooperatively form a housing, and the bottom wall or the at least one side wall is provided with at least one first snap member;
the frame comprises a load plate and a side plate, wherein the side plate is provided with at least one second snap member;
the at least one first snap member and the at least one second snap member are configured to form at least one snap-fit assembly; and
the frame further comprises a second side plate, arranged at a front side of the load plate.

2. The assembly structure of claim 1, wherein height of the frame is configured such that the frame is able to accommodate a backlight module.

3. The assembly structure of claim 1, wherein the at least one snap-fit assembly has an interlock structure.

4. The assembly structure of claim 1, wherein the at least one side wall is provided with at least one first snap member.

5. The assembly structure of claim 4, wherein the at least one first snap member comprises at least one first cantilever beam, extending from an inner surface of the at least one side wall and pointing toward the bottom wall.

6. The assembly structure of claim 5, wherein the at least one second snap member comprises at least one second cantilever beam, extending from the side plate and pointing away from the bottom wall and toward the inner surface of the at least one side wall of the back cover.

7. The assembly structure of claim 6, wherein the side plate and the at least one second cantilever beam are integrated.

8. The assembly structure of claim 6, wherein the side plate and the at least one second cantilever beam are separated.

9. The assembly structure of claim 6, wherein the at least one snap-fit assembly comprises 4-8 sets of snap-fit assembly.

10. The assembly structure of claim 6, wherein the at least one second cantilever beam has a shape of a barb or an inverted triangle.

11. An assembly structure comprising:
a back cover, and
a frame;
wherein:
the back cover comprises a bottom wall and at least one side wall, wherein the bottom wall and the at least one side wall cooperatively form a housing, and the bottom wall or the at least one side wall is provided with at least one first snap member;
the frame comprises a load plate and a side plate, wherein the side plate is provided with at least one second snap member;
the at least one first snap member and the at least one second snap member are configured to form at least one snap-fit assembly;
the at least one side wall is provided with at least one first snap member;

the at least one first snap member comprises at least one first cantilever beam, extending from an inner surface of the at least one side wall and pointing toward the bottom wall;

the at least one second snap member comprises at least one second cantilever beam, extending from the side plate and pointing away from the bottom wall and toward the inner surface of the at least one side wall of the back cover; and the at least one second cantilever beam has a shape of a barb, and an angle between the at least one second cantilever beam and the bottom wall of the back cover is in a range of approximately 30°-45°.

12. The assembly structure of claim 11, wherein a second angle between the at least one first cantilever beam and the bottom wall of the back cover is configured to equal to the angle between the at least one second cantilever beam and the bottom wall of the back cover.

13. The assembly structure of claim 1, wherein the at least one first snap member is shaped by bending, and the at least one second snap member is shaped by molding.

14. An assembly structure comprising:
a back cover, and
a frame;
wherein:
the back cover comprises a bottom wall and at least one side wall, wherein the bottom wall and the at least one side wall cooperatively form a housing, and the bottom wall or the at least one side wall is provided with at least one first snap member;

the frame comprises a load plate and a side plate, wherein the side plate is provided with at least one second snap member;

the at least one first snap member and the at least one second snap member are configured to form at least one snap-fit assembly;

the at least one side wall is provided with at least one first snap member;

the at least one first snap member comprises at least one first cantilever beam, extending from an inner surface of the at least one side wall and pointing toward the bottom wall;

the at least one second snap member comprises at least one second cantilever beam, extending from the side plate and pointing away from the bottom wall and toward the inner surface of the at least one side wall of the back cover; and a rounded corner is configured where any two neighboring surfaces of the at least one second cantilever beam intersect.

15. A display apparatus comprising the assembly structure according to claim 1.

16. The display apparatus of claim 15, wherein the assembly structure comprises a backlight module.

* * * * *